United States Patent Office 3,584,076
Patented June 8, 1971

3,584,076
PROCESS FOR POLYMERIZATION OF ETHYLENICALLY UNSATURATED COMPOUNDS EMPLOYING A PEROXIDE AND AN ENOLIZABLE KETONE
Edward Chetakian, Anaheim, Calif., assignor to The Norac Company, Inc., Azusa, Calif.
No Drawing. Continuation-in-part of application Ser. No. 732,078, May 27, 1968, which is a continuation-in-part of application Ser. No. 657,751, Aug. 2, 1967, which is a continuation-in-part of application Ser. No. 447,547, Apr. 12, 1965, now Patent No. 3,398,213, which in turn is a continuation-in-part of application Ser. No. 50,308, Aug. 18, 1960. This application June 9, 1969, Ser. No. 831,720
Int. Cl. C08f *21/02, 7/04, 3/04*
U.S. Cl. 260—863    22 Claims

ABSTRACT OF THE DISCLOSURE

The rate of polymerization initiation of unsaturated polyester resins and other monomers by redox reactions involving peroxides such as methyl ethyl ketone peroxide and tert-butyl perbenzoate with soluble salts of redox active metals such as cobalt octoate is greatly accelerated in the presence of enolizable ketones such as 2,4-pentanedione.

This invention relates to improved redox polymerization accelerators.

The instant invention involves the discovery that two broad classes of easily enolizable ketones exhibit an extraordinary synergism with redox reactive metals in the form of their soluble salts on the initiation of polymerization of ethylenically unsaturated compounds by the redox mechanism involving the reactive metal and peroxide compounds. This application is a continuation-in-part of copending application Ser. No. 732,078 filed May 27, 1968 now abandoned, which was in turn a continuation-in-part of copending application Ser. No. 657,751 filed Aug. 2, 1967 now abandoned, which was in turn a continuation-in-part of copending application Ser. No. 447,-547 filed Apr. 12, 1965, Pat. No. 3,398,213, which was in turn a continuation-in-part of copending application Ser. No. 50,308 filed Aug. 18, 1960, now abandoned.

The redox initiated polymerization of vinyl monomers by a soluble salt of a redox active metal and an organic peroxide or peroxide compound is of great commercial importance today. It has been found to be particularly useful where it is desired to carry out polymerizations at room or moderate temperature since common organic peroxides homolyze too slowly at these temperatures to be effective. The redox process therefore is particularly useful with those monomer systems that have relatively high rates of polymerization at room temperature. Such processes have wide commercial application in the laminating field, particularly when employed with the "unsaturated polyester resins" of commerce and related materials. Room and moderate temperature applications are not the only areas where these processes have been found to be useful. In match metal die molding, the use of a redox process permits the tailoring of a peroxide's decomposition rate to the particular application conditions and also permits the use of less expensive and higher stability peroxides.

In the redox polymerization initiation process, as commonly employed at room temperature, a ketone peroxide such as methyl ethyl ketone peroxide or cyclohexanone peroxide is added to a monomer, such as an unsaturated polyester resin, containing a soluble salt of a reactive metal such as manganese octoate or cobalt naphthenate (in a few applications the order of addition of metal salt is reversed). The redox reaction between the metal ion and the peroxide produces free radicals which react with the monomer and initiate the polymerization. In an elevated temperature application, a pereseter such as tert-butyl perbenzoate is added to a cobalt containing polyester resin and cured in a matched metal die at about 250° F. In another application, a cobalt containing monomer such as methyl methacrylate can be polymerized at elevated temperatures under pressure or as a suspension in water with 2,5-dimethyl-2,5-dioctoylperoxyhexane as the peroxide.

The enolizable ketones are true synergists with the reactive metals in the redox polymerization initiation. Thus, while by themselves, the enolizable ketones are compatible with the organic peroxides employed and have little influence on the rate of polymerization initiation except with peresters, a large acceleration of rate is observed in combination with the reactive metal in the redox process. The advantages from the process are many. The marked acceleration in rate of polymerization initiation makes possible more rapid processing with resulting cost reduction, a reduction in the amount of peroxide or of redox reactive metal salt required. A reduction in peroxide employed gives a saving in cost. A reduction in metal concentration reduces the color level of the final product since many of the salts are highly colored. The enolizable ketones also reduce the level of the color present. The acceleration of the redox reaction also permits the use of peroxides that would be too slow otherwise. This gives the formulator the option of selecting less expensive peroxides or ones that are more stable and easily handled. This is particularly true with the use of peresters in high temperature applications. Controlling the rates permits the tailoring of the rate to the application.

The enolizable ketones are extraordinary in that they have the advantage that they can be added to the peroxide compound prior to its addition to the vinyl monomer. Most promoters react vigorously or explosively with peroxides. Enolizable ketones also can be added to the monomer, such as the polyester resin, prior to the addition of the peroxide or for short periods the peroxide and monomer can be combined and the reactive metal salt added as a solution in the enolizable ketone. It makes no difference with which component the enolizable ketone is added as far as the final outcome of the reaction. Currently it is the practice of the polyester resin industry to add the promotors, which include the reactive metal salts, and the enolizable ketones at the time of manufacture of the resin. There is an advantage, however, in adding the enolizable ketone in combination with the peroxide compound. It is well known in the industry that many peroxide compounds and particularly organic peroxides are hazardous to handle and store. A great deal of effort currently is being expended in the industry to decrease the hazard of organic peroxides. It is an unusual fact that while the enolizable ketones are accelerators for the redox reaction they are very effective stabilizers or phlegmatizers for organic peroxides. This is particularly true for stabilizing the ketone peroxides, the hydroperoxides and the peresters against explosive decomposition.

Two broad classes of easily enolizable ketones have been found to be particularly useful in this process. The first and probably most useful class of easily enolizable ketones are the β-diketones. Although activity varies considerably from compound to compound the broad class has been found to be active wherein the substitutions are on the 1 to 5 position. Thus whether the substituent is an aryl substituent such as dibenzoylmethane, an alkyl group such as dipivaloylmethane, mixed aryl alkyl such as benzoylacetylmethane or cyclic such as 1,3-cyclohexanedione activity has been noted in all cases. Cyclic compounds with alkyl substitution on the rings have good activity. Thus 5,5-dimethyl-1,3-cyclohexanedione is highly active. Other active compounds are: acetylpropionylmethane, acetylbutyrylmethane, dipropionylmethane, benzoylpropionylmethane, acetylisobutyrylmethane, acetylcyclohexanecarboxoylmethane and indandione. Mono-substitution on the 2 position such as in 2-acetylcyclohexanone is operable but di-substitution is not (will not enolize). The second class of easily enolizable ketones that has been found to have high activity comprises the derivatives of acetoacetic acid. The esters and particularly the methyl and ethyl esters of acetoacetic acid are particularly useful since they are reasonably active and they are readily available commercial compounds. In addition the propylester, butyl ester, benzyl ester and isopropyl ester are all applicable to this process. The exact mechanism of the process by which the chelating agents accelerate and/or increase the efficiency of the redox action is not known nor understood. However, since these are chelating agents it is presumed that such a complex in some way is involved in the synergism. That this is a very complex system is shown by the fact that optimum synergism is observed at a somewhat larger concentration than the stoichiometric ratio of the enolizable ketone and the redox reactive metal. With peresters, a response is obtained in the absence of a redox metal. A large response is observed by the addition of 2,4-pentanedione to a system containing cobalt acetylacetonate and employing a ketone peroxide. The amount of enolizable ketone required to produce an effective response varies from compound to compound but in general is in the range of 0.001 to 5% with the optimum acceleration usually in the range of 0.05 to 2%. The term "Enolizable Ketone" as used herein refers to the β-diketones unsubstituted on the 2 position and the derivatives of acetoacetic acid.

All peroxides that undergo the normal redox reactions with the reactive metal salts have been found to be active in the instant invention. The principal classes of organic peroxides that are active are the hydroperoxides, peroxides derived from ketones and aldehydes, the peracids and hydrogen peroxide. Acyl peroxides and dialkyl peroxides have not been found to be active in the instant process. Organic hydroperoxides that have been found to be active are cumene hydroperoxide, p-isopropylcumene hydroperoxide, tert-butyl hydroperoxide, 2,5-dihydroperoxy-2,5 - dimethylhexane, 2,7 - dihydroperoxy-2,7-dimethyloctane, tert-amyl hydroperoxide and p-methane hydroperoxide. The peroxides found to be the most generally useful in commerce to date are the ketone peroxides. In this we refer to the difunctional (hydroperoxy, hydroxy) monomers and polymers as used in commerce that are active in the redox process.

The terms relating to various commercial peroxides are used in the common sense of commerce. Thus cyclohexanone peroxide refers to the material commonly sold as cyclohexanone peroxide in commerce and is in fact a mixture of several of the polymers of cyclohexanone peroxide. The bis-(1-hydroxycyclohexyl) peroxide also prepared from cyclohexanone is referred to by the chemical name by which it is known commercially. The term methyl ethyl ketone peroxide as used herein refers to the commercial 60% solution in dimethyl phthalate in which concentration it is relatively safe to handle. Methyl ethyl ketone peroxide is also a mixture of several compounds. Peroxides prepared from the following ketones have all been found to be operable in addition to those already mentioned: methyl amyl ketone, methyl isobutyl ketone, 2,4-pentanedione, ethyl acetoacetate, methyl butyl ketone. All were found to exhibit spectacular activity particularly with 2,4-pentanedione, and alkyl acetoacetates. It was especially noted that 2,4-pentanedione produces a strong synergism with the dihydroxyperoxide prepared from 2,4-pentanedione. The peresters are all generally active with the redox system employing a soluble reactive metal salt particularly cobalt and both β-diketones and alkyl acetoacetates. The β-diketones are the most active. The application of the process to peresters promises to be of major commercial importance. While cobalt salts have been employed in the past to reduce the decomposition temperature of peresters the effect was not as marked as the effect of cobalt and related metals with the ketone peroxides. Now by the use of the enolizable ketones, the rates is increased sufficiently to make it of major importance. Thus 2,4-pentanedione increases the rate of initiation of polymerization by peresters over four times that obtained with cobalt alone. Among the peresters that have been found operative in this process are: tert-butyl perbenzoate, tert-butyl per-2-ethylhexanoate, tert-butyl perlaurate, 2,5-dibenzoylperoxy-2,5-dimethylhexane, 2,5-di-p-toluoylperoxy-2,5-dimethylhexane, 2,5-di-2-ethylhexanoylperoxy-2,5-dimethylhexane, 2,5 - dioctanoylperoxy - 2,5 - hexane, 2,7 - dibenzoylperoxy - 2,7 - dimethyloctane, 2,7 - di - 2 - ethylhexanoylperoxy 2,7-dimethyloctane. The effective amount of peroxide employed in the redox system depends upon the particular peroxide and is in general the same or less than the amount normally employed commercially; that is from about 0.05%–3% and usually from 0.1%–2%.

An unexpected discovery has been the acceleration of the perester initiation of polymerization in the presence of enolizable ketones and in the absence of a detectable amount of a redox reactive metal. The effect is quite general for all of the enolizable ketones, primarily the β-diketones, and is related to the general activity of the enolizable ketone with the redox process and the perester. The fact that enolizable ketones are active with peresters in the absence of a redox metal but in the same general order of activity, throws doubt on a simple mechanism, once thought to be related to chelation. An explanation is further complicated by the fact that the effect so far is limited to peresters, although quite general with peresters. All peresters named above that are active with the synergistic redox system are also active in this process. The ketone peroxides, surprisingly have not shown an equivalent activity.

The organic peracids with the "unsaturated polyester resins" and a redox active metal salt such as cobalt give fair gels and poor cheesy cure. By the use of the enolizable ketones a very rapid gel and good cure is obtained. All of the enolizable ketones described above work to some degree but the more active compounds such as 2,4-pentanedione, and ethyl acetoacetate are preferred. Among the redox active metals, cobalt is preferred although the others described such as manganese, molybdenum plus the rare earths in the form of their salts have activity.

Hydrogen peroxide by itself has never found much application as a polymerization initiator due to its effect on the final polymer, poor initiation characteristics and copious gassing. While the gel times are not greatly shortened by the use of enolizable ketones with the redox metals, the cures are greatly shortened and improved with unsaturated polyesters. The cobalt-2,4-pentanedione system is preferred although the redox metals and enolizable ketones as described elsewhere are operable.

The combination of organic peroxides and enolizable ketones is not only a convenient way to handle the enolizable ketones but provides much greater safety in handling the peroxides as herein described. All combinations are possible. Thus the peroxide and enolizable ketone can be liquids and miscible or one can be a solid and soluble or a mixture of solids. The stabilization to explosive decomposition is greater than one would expect from simple dilution and thus the chemical structure is important. The boiling point also has some influence, 2,4-pentanedione and the lower alkyl acetoacetates are particularly effective. Any dilution of the peroxide reduces the hazard but ratios of 0.5–9.5 to 8–2 enolizable ketone to organic peroxide are preferred from the economical handling and most commercial formulations are from 1–9 to 5–5 in order to match initiation requirements.

Of the redox reactive metals salts (which are also driers), cobalt, manganese, nickel and molybdenum salts are particularly effective with cobalt the most generally useful metal. Several of the rare earths also exhibit some activity, namely: europium, praseodymium and ytterbium. The above metals in the form of their salts are all generally active with systems employing hydroperoxides and ketone peroxides. Activity with systems employing peresters is more selective with cobalt, molybdenum and ytterbium salts giving the largest response. The naphanates and octoates are the salts most commonly employed but the acetylacetonates are also employed. The object being to employ salts that are compatible with the non-aqueous system. The redox reactive metal is effective over a wide range. When a cobalt salt is employed, for instance, concentrations are of the same order as those employed commercially or from 0.0001%–0.1% by weight cobalt metal. The term redox reactive metal as used herein refers to those metals whose soluble salts have been found to have activity.

The present invention is effective with all ethylenically unsaturated monomers and resins that polymerize by a free radical mechanism. As stated before, it is particularly useful with those monomers and resins that polymerize at a reasonable rate at room temperature. It therefore has found its greatest application with the unsaturated polyester resins and related materials. "Unsaturated polyester resins" is the term commonly used today to designate a class of resins composed of an alkyd (polyester) resin containing unsaturated sites usually derived from maleic, fumaric or itaconic acid and a vinyl or allyl monomer such as styrene, methyl methacrylate, methyl acrylate, divinylbenzene, chlorostyrene, p-methylstyrene diallylphthalate, diallylomaleate, triallylcyanurate and others. The class is characterized by its very high rate of polymerization at room temperature or only slightly elevated temperatures. The rate of polymerization of the compositions in which the allyl radical is involved is somewhat slower than many of the compositions containing the vinyl monomers. Elevated temperatures are often required when the allyl monomers are employed. In addition to resins with the simple alkyd resin backbone, a large number of resins are now being produced by various manufacturers with different structures or backbones in order to obtain increased resistance to chemicals and other special properties. Such resins are Dow Chemical's Derakanes and American Cyanamid's new chemical resistant resin. These resins also exhibit a high rate of polymerization at room or slightly elevated temperatures and are used in similar applications to unsaturated polyester resin. The term "unsaturated polyester resins" as used herein in the specification and claims is meant to encompass not only the strict sense of a polyester backbone but include all of those structures such as the Derakanes, etc., that have similar characteristics both in initiation and polymerization and are thus indistinguishable except by degree from the resins with an unsaturated polyester backbone. That their characteristics are similar as a class is well recognized in the art. Examples 1 and 2 give the formulation of typical "unsaturated polyester resins." The term "unsaturated polyester resin" is often shortened in use today to just "polyester resin" or even "polyester." It is realized that this is not in accord with strict chemical nomenclature, but these terms are used herein in their common-usage sense since the class of materials they represent are well known by these terms in the art. The present invention is also very effective with vinyl monomers such as methyl methacrylate, methyl acrylate, p-methylstyrene, chlorostyrene, vinyl acetate, diallylphthalate and styrene.

The term bulk polymerization is used to refer to mass polymerization such as is employed in the casting of polyester rods, laminating with fiberglass as in the manufacture of boats, casting of lamp bases in which water is emulsified in the resin, casting of sheets of polymethyl methacrylate, the preparation of polystyrene beads by polymerization of styrene suspended in water to control temperature. In other words, polymerization in which the monomer and polymer remain together in a single phase.

EXAMPLE 1

To samples of a typical "unsaturated polyester resin" prepared as follows:

65% alkyd (polyester) resin acid No. 45–50 prepared from 1 mole maleic anhydride, 1 mole phthalic anhydride and 2.2 moles propylene glycol.

35% styrene plus 0.13% hydroquinone, and 0.03% cobalt as cobalt naphthenate and containing varying amounts of 2,4-pentanedione was added 1% methyl ethyl ketone peroxide at 25° C. as follows:

| 2,4-pentanedione, percent | Gel time, mins. | Cure time,[1] mins. |
|---|---|---|
| 0 | 28 | 124 |
| 0.001 | 26.5 | 113 |
| 0.01 | 25 | 103 |
| 0.05 | 23 | 88 |
| 0.10 | 17.5 | 64 |
| 0.20 | 12.7 | 52 |
| 0.40 | 8.2 | 35 |
| 0.80 | 7.1 | 35 |
| 1.60 | 6.0 | 64 |
| 2.40 | 7 | 113 |
| 3.20 | 8 | 163 |
| 4.80 | 9.5 | 186 |

[1] Cure time as given in these examples is the time for a thin section to reach 10 on the Barcol 935 Impressometer.

EXAMPLE 2

To sample of a typical chemical resistant "double promoted resin" prepared as follows:

70% of an alkyd (polyester) resin prepared from 1 mole maleic anhydride, 1 mol phthalic anhydride and 2.1 moles bisphenol A.

30% of styrene plus 0.013% hydroquinone and 0.03% cobalt as cobalt naphthenate and 0.06% dimethyl aniline containing the following amounts of ethyl acetoacetate was added 1% methyl ethyl ketone peroxide at 25° C. as follows:

| Ethyl acetoacetate, percent | Gel time, mins. | Cure time, mins. |
|---|---|---|
| 0 | 20.5 | 80 |
| 0.05 | 19 | 73 |
| 0.10 | 20 | 71 |
| 0.20 | 19 | 64 |
| 0.4 | 16 | 47 |
| 0.8 | 13 | 35 |
| 1.6 | 10.5 | 15 |
| 3.2 | 7.5 | 15 |

EXAMPLE 3

Resin and method of Example 1.

1% methyl ethyl ketone peroxide 20° C. 0.4% of additive, as follows:

Gel time, min.
Control _____ 57
2,4-pentanedione _____ 13
Ethyl acetoacetate _____ 42
2,3-butanone _____ 41
2,5-hexanedione _____ 58

EXAMPLE 4

Resin and method of Example 1.

1% methyl ethyl ketone peroxide 23° C. 1% of additive as follows:

Gel time, min.
Control _____ 37
Methyl ethyl ketone _____ 50
Acetone _____ 40
Cyclohexanone _____ 40
Ethyl acetoacetate _____ 14
2,4-pentanedione _____ 7

EXAMPLE 5

The resin and method of Example 1.
1% methyl ethyl ketone peroxide 22° C. as follows:

| Dibenzoylmethane, percent: | Gel time, min. |
|---|---|
| 0 | 49 |
| 0.10 | 40.5 |
| 0.30 | 29.0 |

EXAMPLE 6

The resin and method of Example 2.

| Dipivaloyl methane, percent | Gel time, minutes | Temp., 25° cure [1] at 80 mins. |
|---|---|---|
| 0 | 19 | 20 |
| 0.05 | 18.5 | 30 |
| 0.10 | 17.5 | 35 |
| 0.20 | 18.5 | 30 |

[1] Barcol 935 Impressometer.

EXAMPLE 7

The resin method of Example 1.
1% of organic peroxide 25° C. as follows:

| | Gel time, minutes | |
|---|---|---|
| 2,4-pentanedione, percent | Bis(1-hydroxy-cyclohexyl-1) peroxide | Cyclo-hexanone peroxide |
| 0 | 67 | 40 |
| 0.05 | 15 | 27 |
| 0.10 | <12 | |
| 0.2 | <10 | 23 |
| 0.4 | 8 | 21 |
| 0.8 | 13 | 21 |
| 1.6 | 23 | 21 |
| 2.4 | 28 | 28 |
| 3.2 | 32 | 36 |
| 4.8 | 31 | 49 |

EXAMPLE 8

The resin and method of Example 1. 25° C. as follows:

| | Gel time, minutes | |
|---|---|---|
| 2,4-pentanedione, percent | 2% tert-butyl hydroperoxide | 1% cumene hydroperoxide |
| 0 | >500 | 426 |
| 0.10 | >500 | 319 |
| 0.40 | 313 | 222 |
| 1.60 | 301 | 270 |
| 6.40 | 359 | 303 |

EXAMPLE 9

The resin of Example 1 but with the cobalt naphthenate concentration as specified below was combined with 1% 2,4-pentanedione and 1% methyl ethyl ketone peroxide as follows:

| 6% cobalt naphthenate: | Gel time, min. |
|---|---|
| 0 | >360 |
| 0.01 | 240 |
| 0.02 | 120 |
| 0.05 | 55 |
| 0.10 | 15 |
| 0.2 | 7.5 |
| 0.5 | 4.5 |

Without 2,4-pentaedione:
  1% manganese naphthenate (6%) _____hr__ 10
  Same with 1% ethyl acetoacetate _____min__ 84

EXAMPLE 10

The resin and method of Example 1.
1% methyl ethyl ketone peroxide 28° C. as follows:

| Additive | Peak exotherm, °C. | Time to peak exotherm, mins. |
|---|---|---|
| 0 | 160 | 43 |
| 0.4% ethyl acetoacetate | 167.5 | 31 |
| 0.4% 2,4-pentanedione | 175 | 15 |
| 0.4% 2,3-butanedione | 103 | 130 |

EXAMPLE 11

The resin and method of Example 1.
0.28% $H_2O_2$ 19° C. as follows:

| 2,4-pentanedione, percent | Gel time, mins. | Cure time, mins. |
|---|---|---|
| 0 | 8¾ | 171 |
| 0.01 | 7½ | 113 |
| 0.02 | 7½ | 77 |
| 0.05 | 7¼ | 27 |
| 0.10 | 7¼ | 18 |

0.45% $H_2O_2$

| Ethyl acetoacetate | Gel time, mins. | Cure time, mins. |
|---|---|---|
| 0 | 6 | 107 |
| 0.5 | 5¾ | 21¼ |

EXAMPLE 12

To the resin of Example 1 but without cobalt naphthenate was added the following:
1% methyl ethyl ketone peroxide 22° C.

| | 2,4-pentanedione, percent | Gel time mins. | Cure time mins. |
|---|---|---|---|
| Cobalt acetylacetonate: | | | |
| 0.132% | 0 | 14.5 | 66 |
| 0.132% | 0.2 | 7 | 22 |
| Cobalt naphthenate (6%): | | | |
| 0.5% | 0 | 20 | 115 |
| 0.5% | 0.2 | 6.5 | 22.5 |

EXAMPLE 13

The resin and method of Example 1 23° C.

| 2,4-pentanedione, percent | Peroxide, 1% | Gel time | Cure time |
|---|---|---|---|
| 0.5 | Benzoyl peroxide | >24 hrs | |
| 0.5 | 2,4-dichlorobenzoyl peroxide | >24 hrs | |
| 0.5 | Di-tert-butyl peroxide | >24 hrs | |
| 0.5 | Perlauric acid | 2¾ min., tack free 10 min. | 18 hrs., Barcol 40. |
| 0 | do | 47 min., tack free 10 hrs. | >30 hrs. |
| 0.5 | Methyl ethyl ketone peroxide | 8 min. | 45 min. |

EXAMPLE 14

The resin and method of Example 1. 20° C. as follows:

| 2,4-pentanedione, percent | | Gel time, mins. | Cure time, mins |
|---|---|---|---|
| A. 0 | 3,5-dimethyl-3,5-dihydroxy-1,2-peroxycyclopentane, 0.16% | 57 | 45 |
| B. 0.5 | 3,5-dimethyl-3,5-dihydroxy-1,2-peroxycyclopentane, 0.16 | 11¼ | 13 |
| C. 0 | Ethyl 3-hydroxy-3-hydroperoxybutyrate, 1.0 | 6 | 27 |
| D. 0.5 | 1.0 | 6 | 8 |

EXAMPLE 15

(1) To the resin of Example 1 was added 1% methyl acetoacetate after standing 1% methyl ethyl ketone peroxide was added. Gel time: 19 min.

(2) A mixture of 50% of methyl ethyl ketone peroxide and 50% methyl acetoacetate was made and after standing 2% was added to the resin of Example 1. Gel time: 18¾ min.

(3) A control of 1% methyl ketone peroxide with the resin of Example 1.

Gel time _____ min__ 43
Temperature _____ °C__ 43

EXAMPLE 16

The following monomers containing 1% of cobalt naphthenate (6%) were treated as follows with 1% methyl ethyl ketone peroxide.

60° C.: Gel time
Methyl methacrylate _____ 95 min.
Methyl methacrylate plus 0.5% 2,4-pentanedione _____ 35 min.
Room temperature (0.5% cobalt naphthenate):
Methyl methacrylate _____ >48 hrs.
Methyl methacrylate plus 0.5% 2,4-pentanedione _____ 8 hrs.
Heated at 105° C. for 4 hrs. and 20 min. then raised to 145° C.:
Vinyltoluene _____ 5 hrs. 10 min.
Vinyltoluene plus 0.5% 2,4-pentanedione _____ 4 hrs. 50 min.
Styrene _____ 5 hrs. 50 min.
Styrene plus 0.5% 2,4-pentanedione _____ 5 hrs. 20 min.

EXAMPLE 17

A 50 ml. sample of a mixture of equal amounts of tert-butyl perbenzoate and 2,4-pentanedione were placed in an accelerated aging oven at 110° F. for a period of two months and the activity compared with a similar sample of tert-butyl perbenzoate aged for the same period. Resin of Example 1 containing 0.05% cobalt octoate (6%) at 185° F., 100 g., sample was used for comparison and 0.4% of initiator sample.

|  | Time to peak exotherm, mins. | Active oxygen content, percent | Color |
|---|---|---|---|
| Initiator: |  |  |  |
| 50/50 tert-butyl perbenzoate, 2,4-pentanedione. | 18½ | 49.2 | Very light yellow. |
| Tert-butyl perbenzoate____ | 46 | 97.1 | Do. |
| After 2 months aging: |  |  |  |
| 50/50 tert-butyl perbenzoate, 2,4-pentanedione. | 23.8 | 58.5 | Do. |
| Tert-butyl perbenzoate____ | 55.2 | 97.1 | Deep yellow. |

EXAMPLE 18

The standard resin and method of Example 1 but containing the following metal salts instead of cobalt.

Methyl Ethyl Ketone Peroxide, 2.5%

| Metal salt | Concentration, percent | 2,4-pentanedione, percent | Gel time, mins. | Cure time,[1] mins. |
|---|---|---|---|---|
| Vanadium naphthenate (5%)___ | 0.05 | 0 | 7.3 | 172 |
| Do_____ | 0.05 | 2 | 5.0 | 87 |
| Molybdenum naphthenate (8%)_____ | 0.05 | 0 | 283 | _____ |
| Do_____ | 0.05 | 2 | 51 | _____ |
| Nickel acetylacetonate_____ | 0.1 | 0 | >300 | _____ |
| Do_____ | 0.1 | 0.1 | 180 | _____ |
| Vanadyl acetylacetonate_____ | 0.1 | 0 | 37 | _____ |
| Do_____ | 0.1 | 0.1 | 22 | _____ |
| Europium acetylacetonate_____ | 0.1 | 0 | >300 | _____ |
| Do_____ | 0.1 | 0.1 | 97 | _____ |
| Praseodymium acetylacetonate_ | 0.1 | 0 | >300 | _____ |
| Do_____ | 0.1 | 0.1 | ([2]) | _____ |
| Control_____ | 0 | 0 | >300 | _____ |
| Do_____ | 0 | 0.1 | >300 | _____ |

[1] Time from gel to initial cure.
[2] Very thick at 300 min.

Methyl Ethyl Ketone Peroxide, 1%

| 2-acetylcyclohexanone | Gel time, mins. |
|---|---|
| Cobalt napthenate (6%): |  |
| 0.5%_____ 0%_____ | 44 |
| 0.5%_____ 0.1_____ | 30.5 |
| 0.5%_____ Indanedione, 0.1%_____ | 38 |
| 0.5%_____ 2,2,4,4-tetramethylcyclobutane-1,3-dione, 0.1%. | 44.5 |

EXAMPLE 19

The standard resin of Example 1 was heated (100 g.) in a 185° F bath with the concentration of metal salt, enolizable ketone and peroxy compound given below and the time to peak exotherm noted.

0.4% Tert-Butyl Perbenzoate

| Metal salt | Enolizable ketone | | Time to exotherm, minutes |
|---|---|---|---|
|  | | 2,4-pentanedione, percent | |
| 0.0%____ | | 0.0 | 130.6 |
|  | | 0.1 | 125 |
|  | | 0.15 | 71.6 |
|  | | 1.0 | 41.6 |
|  | | 5.0 | 32 |
|  | Ethyl acetoacetate, 1.0% | 1.0 | 37.4 |
|  | ___do_____ | 0 | 91.4 |
|  | Ethyl acetoacetate, 3.0. | 0 | 85.6 |
|  | Acetylbenzoylmethane, 1.0. | _____ | 92.8 |
|  | Dibenzoylmethane, 1.0. | _____ | 77.8 |
|  | 5,5-dimethyl-1,3-cyclohexanedione, 0.25. | _____ | 68.2 |
|  | 1,3-cyclohexanedione, 0.25. | _____ | 21.4 |
| Cobalt octoate (6%): | | | |
| 0.05%____ | | 0.0 | 33.2 |
| 0.05%____ | | 0.01 | 25 |
| 0.05%____ | | 0.1 | 17 |
| 0.05%____ | | 1.0 | 9.0 |
| 0.05%____ | | 2.0 | 9.9 |
| 0.05%____ | | 5.0 | 10.0 |

| Metal salt | Enolizable ketone | Time to peak exotherm, mins. |
|---|---|---|
| Cobalt octoate (6%): | | |
| 0.05%____ | Ethyl acetoacetate, 3.0%____ | 27.2 |
| 0.05%____ | Acetylbenzoylmethane, 1.0____ | 14.6 |
| 0.05%____ | Dibenzoylmethane, 1.0____ | 17.4 |
| 0.05%____ | 5,5-dimethylcyclohexane 1,3-dione, 0.25. | 27.8 |
| 0.05%____ | 1,3-cyclohexanedione, 0.25____ | 12.2 |
| Vanadium naphthenate (5%): | | |
| 0.05%____ | 2,4-pentanedione, 0.0%____ | 16 |
| 0.05%____ | 2,4-pentanedione, 0.1____ | 13.2 |
| 0.05%____ | 2,4-pentanedione, 0.2____ | 12.6 |
| 0.05%____ | Ethyl acetoacetate, 3____ | 14.0 |
| 0.05%____ | 5,5-dimethyl-1,3-cyclohexanedione, 0.25. | 14.6 |
| 0.05%____ | 1,3-cyclohexanedione, 0.25____ | 9.4 |
| Molybdenum naphthenate (8%): | | |
| 0.05%____ | 2,4-pentanedione, 0____ | 33 |
| 0.05%____ | 2,4-pentanedione, 0.1____ | 32.6 |
| 0.05%____ | 2,4-pentanedione, 0.2____ | 32.2 |
| 0.05%____ | 2,4-pentanedione, 1.0____ | 27.8 |
| 0.0%____ | 0.5% methyl ethyl ketone peroxide, 2,4-pentanedione, 0. | 17.6 |
| 0.0%____ | 0.5% methyl ethyl ketone peroxide, 2,4-pentanedione, 0.5. | 17.4 |
| 0.0%____ | 0.5% methyl ethyl ketone peroxide, 2,4-pentanedione, 1.0. | 17.2 |
| 0.0%____ | 0.4% 2,5-dibenzoylperoxy-2,5-dimethylhexane, 2,4-pentanedione, 0. | 88.4 |
| 0.0%____ | 0.4% 2,5-dibenzoylperoxy-2,5-dimethylhexane, 2,4-pentanedione, 1.0. | 30.4 |
| Cobalt octoate (6%): | | |
| 0.05____ | 0.4% 2,5-dibenzoylperoxy-2,5-dimethylhexane, 2,4-pentanedione, 0.0: | 32.8 |
| 0.05____ | 0.4% 2,5-dibernoylperoxy-2,5-dimethylhexnae, 2,4-pentanedione, 1.0. | 7.6 |
|  | 0.4% 2,5-dioctanoylperoxy-2,5-dimethylhexane 2,4-pentanedione, 0%. | 68 |
|  | 1.0____ | 28.8 |

| Metal salt | Enolizable ketone | Time to peak exotherm, mins. |
|---|---|---|
| Cobalt octate (6%): | | |
| 0.05% | 0.0 | 24.2 |
| 0.05% | 1.0 | 11.0 |
| | 0.4% 2,5-di-2-ethylhexanoylperoxy-2,5-dimethylhexane 2,4-pentanedione, 0%. | 30.2 |
| | 1.0 | 21.8 |
| 0.05% | 0.0 | 21.6 |
| 0.05% | 1.0 | 8.6 |
| Ytterbium acetylacetonate: | | |
| 0.4% | 0 | 13.8 |
| 0.4% | 0.1 | 12.2 |

EXAMPLE 20

To a 500 g. portion of the polyester resin of Example 1 containing 0.05% of cobalt octoate (6%) was added 0.4% of tertbutyl perbenzoate and 1% 2,4-pentanedione and the mixture maintained at room temperature. Gellation occurred in 7 days.

EXAMPLE 21

A 50 g. portion of methyl methacrylate was heated at 185° F. with 0.4% of 2,5-di-2-ethylhexanoylperoxy-2,5-dimethylhexane with the following additives and the time to peak exotherm noted.

| Cobalt octoate (6%) | 2,4-pentanedione, percent | Time to peak exotherm, mins. |
|---|---|---|
| 0% | 0 | 21.2 |
| 0.05% | 0 | 22.2 |
| 0.05% | 1 | 16.3 |

EXAMPLE 22

The term PVT test refers to a pressure vessel test developed in Holland by Dr. E. W. Lindeijer at the Technological Laboratory of the National Defense Research Organization and work with it in this country is described by O. T. Mageli et al., Ind. Eng. Chem. 56, 18 (1964). It consists essentially of a pressure vessel into which a sample is placed in a standard metal cup. On top is fitted a burst diaphragm calibrated for 100 p.s.i. On the side is a fitting into which discs having varying apertures can be inserted. Using a standard heating rate, the smallest aperture that can be tolerated without rupture of the burst diaphragm is determined for a given compound. The smaller the aperture the less hazardous the compound.

| Initiator: | PVT (minimum orifice to pass, mm.) |
|---|---|
| Tert-butyl perbenzoate | 5 |
| 50% tert-butyl perbenzoate<br>50% 2,4-pentanedione | 1½ |

I claim:

1. The process of initiation of the bulk polymerization of ethylenically unsaturated compounds, polymerizable by methyl ethyl ketone peroxide, said process comprising admixing with said ethylenically unsaturated compound (1) 0.0001% to 0.1% based on metal of a redox reactive metal salt soluble in said unsaturated compound, selected from the group consisting of: cobalt, manganese, nickel, molybdenum, and europium; (2) 0.001% to 5% of an enolizable ketone selected from the group consisting of alkyl esters of acetoacetic acid, 2,4-pentanedione, acetylbenzoylmethane, dibenzoylmethane; (3) 0.05% to 3% of a peroxide compound selected from the group consisting of hydrogen peroxide, organic peracids, ketone peroxides and tertiary hydroperoxides.

2. The process of claim 1 wherein the ethylenically unsaturated compound is selected from a group consisting of: alkyl esters of methacrylic acid, styrene, vinyl toluene, chlorostyrene and mixtures of an unsaturated polyester with a copolymerizable ethylenically unsaturated monomer.

3. The process of claim 2 wherein the ethylenically unsaturated compound is an unsaturated polyester resin, and the redox reactive metal salt is a salt of cobalt.

4. The process of claim 3 wherein the enolizable ketone is 2,4-pentanedione.

5. The process of claim 4 wherein the peroxide compound is a lower ketone peroxide.

6. The process of claim 5 wherein the ketone peroxide is methyl ethyl ketone peroxide.

7. The process of claim 5 wherein the ketone peroxide is 3,5-dihydroxy-3,5-dimethyl-1,2-peroxycyclopentane.

8. The process of claim 5 wherein the ketone peroxide is a cyclohexanone peroxide.

9. The process of claim 4 wherein the peroxide compound is hydrogen peroxide.

10. The process of claim 4 wherein the peroxide compound selected from the group consisting of tertiary alkyl hydroperoxides and dihydroperoxides, tertiary aralkyl hydroperoxides and tertiary cycloalkyl hydroperoxides.

11. The process of initiation of the bulk polymerization of ethylenically unsaturated compounds, polymerizable by methyl ethyl ketone peroxide, said process comprising admixing with said ethylenically unsaturated compound (1) 0.0 to 0.1% based on metal, of a redox reactive metal salt soluble in said unsaturated compound, selected from the group consisting of: cobalt, molybdenum and ytterbium; (2) 0.01 to 5% of an enolizable ketone selected from the group comprising aralkyl acetoacetates, alkyl acetoacetates, and β-diketones; (3) 0.05 to 3% of a tertiary organic perester.

12. The process of claim 11 wherein the ethylenically unsaturated compound is a mixture of an unsaturated polyesters with a copolymerizable, ethylenically unsaturated monomer and the redox reactive metal salt is a salt of cobalt.

13. The process of claim 12 wherein the enolizable ketone is selected from the group consisting of: methyl acetoacetate, ethyl acetoacetate, 2,4-pentanedione, acetylbenzoylmethane, dibenzoylmethane, 5,5-dimethyl-1,3-cyclohexanedione, 1,3-cyclohexanedione.

14. The process of claim 13 in which the enolizable ketone is 2,4-pentanedione.

15. The process of claim 14 in which the tertiary organic perester is selected from the group consisting of: mono and di tertiary alkyl peresters of carboxylic acids.

16. The process of claim 15 in which the organic perester is tert-butyl perbenzoate.

17. The process of claim 15 in which the organic perester is tert-butyl per-2-ethylhexanoate.

18. The process of claim 15 in which the organic perester is tert-butyl per-octanoate.

19. The process of claim 15 in which the organic perester is 2,5-di-2-ethyl hexanoylperoxy-2,5-dimethylhexane.

20. In the polymerization of a mixture of an unsaturated polyester with a copolymerizable, ethylenically unsaturated monomer in the presence of a soluble salt of cobalt and methyl ethyl ketone peroxide, the process of adding an enolizable ketone selected from the group consisting of: an ester of acetoacetic acid, 2,4-pentanedione, acetylbenzoylmethane, dibenzoylmethane, to the unsaturated polyester resin mixtures.

21. The process of claim 20 in which the enolizable ketone is 2,4-pentanedione.

22. The process of claim 20 in which the enolizable ketone is an alkyl ester of acetoacetic acid.

References Cited

UNITED STATES PATENTS

| | | | |
|---|---|---|---|
| 3,333,021 | 7/1967 | Geipert | 260—863 |
| 3,398,213 | 8/1968 | Chetakian | 260—863 |

FOREIGN PATENTS

| | | | |
|---|---|---|---|
| 1,206,584 | 12/1965 | Germany | 260—863 |
| 1,164,089 | 2/1964 | Germany | 260—863 |
| 1,176,864 | 8/1964 | Germany | 260—863 |

OTHER REFERENCES

Wallace and Tiernan Inc./Lucidol Division: Product Bulletin 6.401, 3/65, pp. 1-6.

WILLIAM H. SHORT, Primary Examiner

R. J. KOCH, Assistant Examiner

U.S. Cl. X.R.

260—75M, 75UA, 78.5BB, 78.5B, 78.5UA, 80.3, 89.5R, 89.5A, 91.5 93.5R, 93.7, 94.3, 94.9B, 94.9CA